No. 629,064. Patented July 18, 1899.
J. F. T. CONTI.
AUTOMOBILE VEHICLE.
(Application filed Dec. 15, 1898.)
(No Model.) 3 Sheets—Sheet 1.

WITNESSES INVENTOR
Fred White James Felix Tiburce Conti,
Thomas F. Wallace By his Attorneys:
Arthur C. Fraser No. 629,064. Patented July 18, 1899.
J. F. T. CONTI.
AUTOMOBILE VEHICLE.
(Application filed Dec. 15, 1898.)
(No Model.) 3 Sheets—Sheet 2.

WITNESSES: INVENTOR
Fred. White James Felix Tiburce Conti,
Thomas F. Wallace By his Attorneys No. 629,064. Patented July 18, 1899.
J. F. T. CONTI.
AUTOMOBILE VEHICLE.
(Application filed Dec. 15, 1898.)
(No Model.) 3 Sheets—Sheet 3.
FIG. 3.
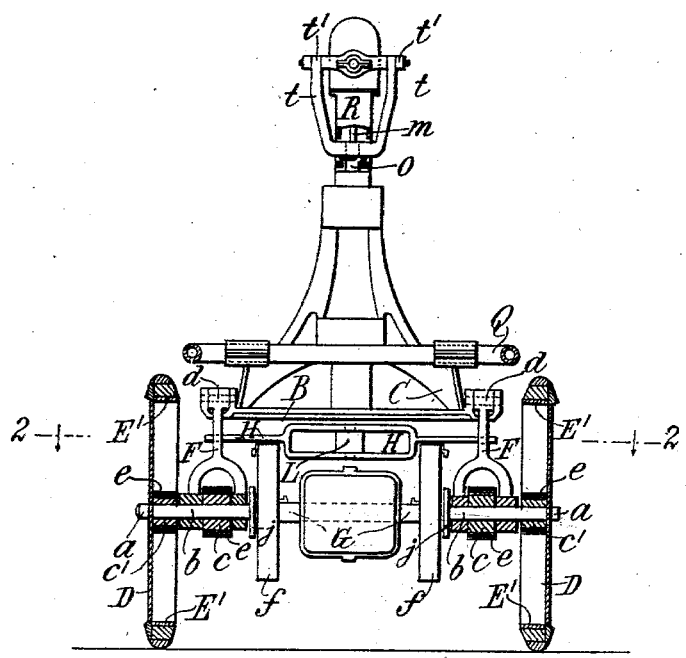
FIG. 5. FIG. 4.
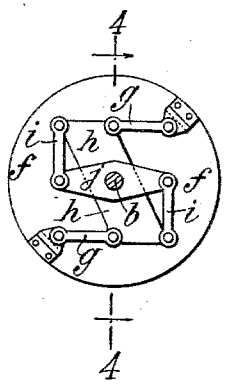 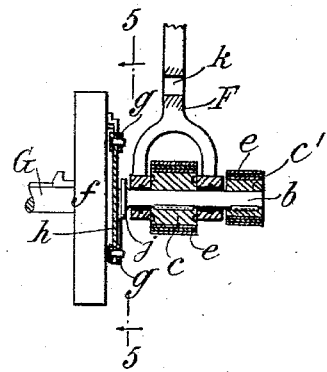
WITNESSES: INVENTOR:
Fred White James Felix Tiburce Conti,
Thomas F. Wallach By his Attorneys:

UNITED STATES PATENT OFFICE.

JAMES FELIX TIBURCE CONTI, OF PARIS, FRANCE, ASSIGNOR TO THE SOCIÉTÉ CHOCONIN ET CIE., OF SAME PLACE.

AUTOMOBILE VEHICLE.

SPECIFICATION forming part of Letters Patent No. 629,064, dated July 18, 1899.

Application filed December 15, 1898. Serial No. 699,299. (No model.)

*To all whom it may concern:*

Be it known that I, JAMES FELIX TIBURCE CONTI, a citizen of the Republic of France, residing in Paris, France, have invented certain new and useful Improvements in Automobile Vehicles, of which the following is a specification.

The present invention has for its object improvements which I have effected in the construction of automobile vehicles chiefly relating to the operation of the driving-wheels, which are mounted loosely upon the front axle, and also to the different arrangements whereby the said front driving-axle can be suitably steered, the fore-carriage being connected by a rigid longitudinal frame to the axle of the rear wheel without exerting any pull upon the "body," properly so called, of the vehicle.

My improved vehicle is represented in the accompanying drawings.

Figure 1:
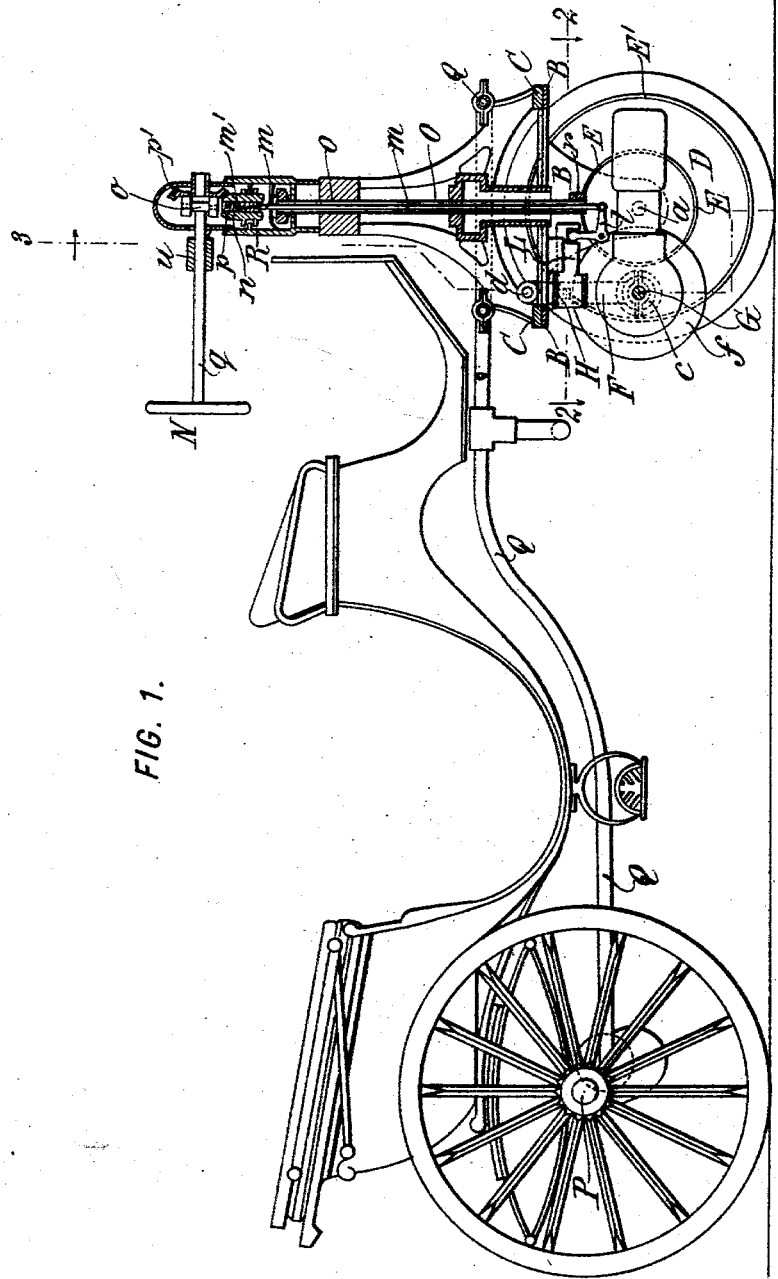
Figure 2:
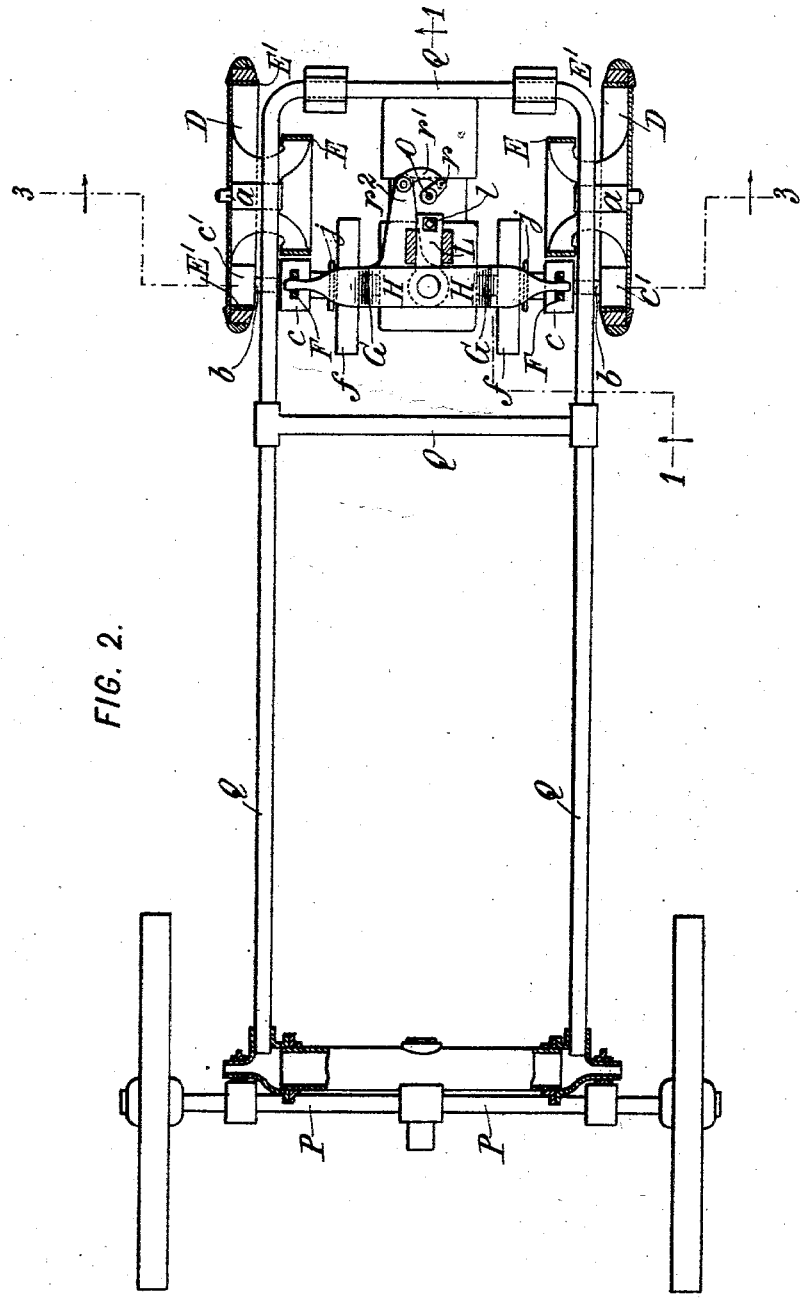

Figure 1 is a longitudinal elevation, partly in section, on the line 1 1 of Fig. 2. Fig. 2 is is a plan, partly in section, on the line 2 2 of Figs. 1 and 3. Fig. 3 is a vertical section cut on the line 3 3 in Figs. 1 and 2 and looking toward the front. Fig. 4 is a fragmentary section through the axis of one of the auxiliary shafts carrying the driving-rollers, drawn to a larger scale, cut on the line 4 4 in Fig. 5 and looking in the direction of the arrow; and Fig. 5 is a transverse section through the line 5 5 of Fig. 4 looking in the direction of the arrow.

The motor fore-carriage comprises two fixed pivots $a$ $a$, carried by a frame B, which can pivot upon a bolster-pin or which can move circularly upon a guide-disk C. (See Fig. 1.) Upon the two pivots $a$ $a$ are loosely mounted two wheels D D, which form the driving-wheels. The hub of each of the wheels D carries a pulley E, which forms a friction-drum. A second friction-drum E' of larger diameter is arranged upon the wheel itself. Through the medium of one or the other of these drums E E' each of the wheels D is actuated either for forward or backward movement. To this end an intermediate shaft $b$ carries two friction-rollers $c$ $c'$, which can make contact—that is to say, either $c$ with E or $c'$ with E'.

This shaft $b$ does not extend throughout the whole width of the vehicle. There is one of the small shafts $b$ upon each side of the driving-frame. Each of the small shafts $b$ is supported by a rod F, which can oscillate around a fixed point $d$ upon the frame B. It will be obvious that according as the rod F is moved forward or backward the roller $c$ will operate the drum E or the roller $c'$ will operate the drum E'. The shaft $b$ always being rotated by the motor in the same direction, the small drum E, with which the roller $c$ will make contact, will cause the vehicle to move forward. On the other hand, the drum E' when the roller $c'$ makes contact with it will cause the vehicle to move backward.

The transmission of the movement of the rollers $c$ and $c'$ to the drums E and E' is effected in the following manner: Upon each roller $c$ $c'$ there is loosely mounted a sleeve $e$, composed of sheets of leather and india-rubber rolled one upon the other, (see detail Fig. 4,) the inside and outside surfaces being of leather. This loose sleeve possesses a certain elasticity. When the roller is applied against the drum, this sleeve is, so to say, "laminated." It is more or less compressed, according as the roller is pressed with a greater or less force upon the drum through the medium of the rod F. It will be obvious that it may happen that the pressure corresponds to the coefficient of friction of the leather and that the drum is rotated without any loss of velocity. If the pressure is below this limit, the sleeve will slide simultaneously upon the roller and upon the drum in such a manner that the corresponding wheel will be driven at a reduced velocity. With this arrangement it is possible to vary the speed of the vehicle as desired with a motor of constant velocity.

I may further mention that the sleeve $e$ being made of a soft material will be more opposed to heating than otherwise would be the case, the more so as the sliding which can produce the heating will only be produced when the pressure is small.

As hereinbefore described, the vehicle runs forward when the shafts $b$ are moved forward in order that the rollers $c$ may come in contact with the drums E, and, inversely, the vehicle will run backward if the drums E' E' are in contact with the rollers $c'$, the small shafts $b$ having been moved backward. When the shafts $b$ are in an intermediate position, the rollers will not be in contact with either drum and the motor can continue to rotate without moving the vehicle either forward or backward.

The two small shafts $b$ $b$ are actuated by a shaft G, which is placed between them and in their prolongation, the said shaft G being the motor-shaft or being directly operated from the said motor. As this shaft G is fixed, since it is actuated by the motor and since the shafts $b$ $b$ should for the reason above explained be adapted to be moved in a parallel direction to effect contact on one side or the other at a greater or less pressure, I have designed the following intermediate connection.

The shaft G has keyed upon it two disks $f$ $f$. (See the detail views, drawn to a larger scale, Figs. 4 and 5.) Each of these disks $f$ is connected by two small rods $g$ $g$ to the two opposite ends of a cross-piece $h$ in the form of a diagonal which is free in space, the two other ends of this cross-piece in the form of a parallelogram being connected by the rods $i$ $i$ to the ends of a cross or balance piece $j$, fixed upon the corresponding shaft $b$. It will be understood that with this arrangement the driving-shaft G, which is fixed in position, can actuate the shaft $b$ without its being in the prolongation of the driving-shaft G and even when the said shaft $b$ is displaced in a parallel manner according to requirement, as hereinbefore described.

I have above mentioned that the parallel displacement of the shafts $b$ $b$ was effected by means of the rods F suspended to the frame. I will now proceed to describe how these two rods or either one or the other of them, as desired, can be actuated.

Each of the rods F is provided with an eye $k$, and in these two eyes are engaged the ends of a balance or rocking lever H, the axis of which is carried by a slide L, controlled by a right-angled lever $l$. The end of the horizontal branch of this lever is pivoted to a rod $m$, which rises vertically from the center of the fore-carriage. This rod $m$ is formed at its upper part with a screwed portion $m'$, with which a nut $n$ engages, the said nut being adapted to turn in a support R, without, however, being able to move upward or downward. The nut $n$ is formed in one with a pinion $p$, with which a pinion $p'$ engages. This latter pinion is connected by a pivoted joint $o$ to a horizontal joint $q$, which carries a hand-wheel N. It will be obvious that by turning this wheel N the nut $n$ is turned, whereby the rod $m$ is caused to move upward or downward, so as to move the balance or rocking piece H forward or backward. This balance-piece acts in the same manner upon the two rods F, and the friction-rollers $c$ or $c'$ come into action for effecting the forward or backward movement.

To provide for turning, it is necessary to give to one only of the driving-wheels D a forward movement, the other driving-wheel not being operated or being even moved slightly backward if the curve to be made is of very small radius. To this end the balance or rocking lever H must have a certain inclination given to it in order that one only of the rollers $c$ comes in contact with the drum E of the wheel to be operated. This inclination of the lever is effected by turning a tube O, which is concentric with the rod $m$ and which carries (see the plan Fig. 2) an arm $r$, connected by a rod $r'$ to an arm $r^2$ of the said lever H. By turning this tube O through a certain angle a slight inclination will be given to the lever H around its axis or pivot $a$. This angular displacement of the tube O is effected in the following manner: The upper end of the said tube O carries a fork $t$, connected by the ends of its arms to another horizontal fork $t'$, carrying at its center a socket or the like $u$. It is in this socket $u$ in which is engaged in such a manner that it can turn therein the horizontal rod $q$, which carries the hand-wheel N. If the driver swings the hand-wheel N to the right or to the left, he will move the fork $t'$ in the same direction, the said fork causing the fork $t$, and consequently the tube O, to oscillate upon its vertical axis.

As will be obvious from the preceding description, the driver has only to manipulate the hand-wheel N to control the mechanism of his vehicle as he desires and according to circumstances. The horizontal rod $q$ being in the axis of the vehicle by turning the hand-wheel to the right or to the left the lever or the like H is moved forward or backward, the said lever acting upon the two rods F, carrying the small shafts $b$ of the driving-rollers $c$ and $c'$, so as to cause the vehicle to run forward or backward.

By pressing the driving-rollers more or less strongly upon their respective drums by turning the hand-wheel N more or less to the right or to the left the driver can vary the velocity of movement of the vehicle without the speed of the motor being modified, because, as above mentioned, the driving-rollers are provided with sleeves which can slide circumferentially if the pressure is not very great.

By swinging the hand-wheel N, and with it the rod $q$, to the right or to the left the driver will give the lever H an inclination more or less great. It will result from this that one only of the driving-wheels will be rotated or that one of them will be rotated more quickly than the other, so that the vehicle can run in a curve.

The driving fore-carriage which I have just described and which forms the traction portion of the vehicle is connected to the rear axle P without affecting in any manner the body of the carriage itself. This connection is effected through the medium of a frame Q, to which is connected by suitable supports the guide-disk C, upon which the frame of the fore-carriage can pivot.

I claim as my invention the following-defined novel features, substantially as hereinbefore specified, namely:

1. The operation of the two auxiliary shafts carrying the friction-rollers by a driving-shaft fixed in position, the connection between this driving-shaft and the lateral auxiliary shafts, which can be displaced in a parallel direction, being effected by a cross-piece in the form of a parallelogram, two diagonally-opposed ends of which are connected by rods to a fixed plate upon the driving-shaft while the two other ends are connected by rods to a cross-piece upon the auxiliary shaft to be operated, this connection permitting the driving of the auxiliary shafts by the motor-shaft without the shafts being arranged in alinement.

2. The parallel displacement of the shafts carrying the driving-rollers by means of rods upon which a balance or rocking lever operates, the axis of the said lever being carried by a movable slide under the action of a vertical rod which can be raised or lowered through the medium of a hand-wheel and an arrangement of two pinions, the latter of which forms a nut upon a screw-threaded portion of the said vertical rod.

3. In mechanism for controlling automobile vehicles the connection of the rod having the hand-wheel with the first pinion having a horizontal axis through the medium of a Cardan joint enabling the pinion to be operated even when the hand-wheel rod is turned to the right or to the left.

4. The mechanism for oscillating the balance or rocking lever of automobile vehicles for the purpose of enabling the motor to act only upon one driving-wheel or upon the two wheels unequally or in opposite directions for causing the vehicle to turn in curves, the said control being effected through the medium of a hollow shaft connected by a rod to an arm upon the said balance-lever, the upper part of this hollow shaft carrying a vertical fork connected to another horizontal fork, the curved part of which carries a socket or the like designed to steer the rod or axle carrying the hand-wheel.

In witness whereof I have hereunto signed my name, this 2d day of December, 1898, in the presence of two subscribing witnesses.

JAMES FELIX TIBURCE CONTI.

Witnesses:
 EDWARD P. MACLEAN,
 AUGUSTE MATHIEU.